Fig. 4.

March 7, 1944. L. E. LA BRIE 2,343,304
HYDRODYNAMIC TRANSMISSION
Filed April 13, 1940 7 Sheets-Sheet 5

INVENTOR
Ludger E. La Brie.
BY Hamess, Lind, Patee & Harris
ATTORNEYS.

Patented Mar. 7, 1944

2,343,304

UNITED STATES PATENT OFFICE 2,343,304

HYDRODYNAMIC TRANSMISSION

Ludger E. La Brie, Detroit, Mich., assignor to Chrysler Corporation, Highland Park, Mich., a corporation of Delaware Application April 13, 1940, Serial No. 329,398

3 Claims. (Cl. 74—189.5)

This invention relates to power transmission mechanism especially for use in automotive vehicles.

More specifically, the invention relates to a motor vehicle power transmission embodying a fluid torque converter in combination with a "kickdown" gear mechanism in which the converter is adapted to act as a simple slip coupling at vehicle cruising speeds and the kickdown gear is arranged in such manner that it is instantly available for increasing the vehicle acceleration when passing other vehicles at high speed and climbing hills in the range of car speeds during which the fluid converter is functioning as a slip coupling.

Heretofore, attempts to utilize fluid torque converters in motor vehicle drive mechanism have not been entirely successful because of the extermely low overall efficiency of the torque converter when used in installations where it is called upon to convert torque through a relatively wide speed range such as that incidental to the driving of a motor vehicle. The present improved arrangement contemplates the use of a fluid torque converter purposely designed for converting engine torque through a relatively narrow range of vehicle speeds, for example, up to 20 M. P. H. at which speed, the torque converter begins to function as an ordinary fluid slip coupling of the kinetic type. With such an arrangement, the highly desirable torque multiplying characteristics of the torque converter may be utilized during acceleration of the vehicle from a standstill and upon the attainment of a speed sufficient to provide good accelerating characteristics in direct drive, the torque converting feature is cut out and the fluid unit is operated as a slip coupling thereby avoiding the penalty of low efficiency which manifests itself in heating of the fluid and excessive fuel consumption. With such an arrangement it is not desirable to provide means for increasing the torque transmitted at high speeds, such as may be desired when passing another vehicle in traffic or on a grade, and the present invention contemplates the use of a kickdown gear mechanism which is under the control of the driver and may be brought into action at will for increasing the acceleration of the vehicle.

The principal object of the invention therefore is to provide an improved transmission for motor vehicles in which the highly desirable qualities and characteristics of the fluid torque converter are utilized and in which the torque converter is operated at a higher degree of efficiency than has heretofore been the case in previous transmissions of this type.

Another object of the invention is to provide an improved motor vehicle transmission in which a mechanical torque multiplying means is used in conjunction with a fluid torque multiplying means, each being adapted to act alone and in combination with the other to provide a flexible and quickly responsive drive.

Another object is to provide an improved dynamic torque converter which is more efficient and more economical to manufacture than those in the prior art.

Another object is to provide improved control means for transmissions of the aforesaid type.

Still another object is to provide an improved cooling means for the working fluid of the fluid converter whereby the working fluid is kept cool, vapors are condensed and the formation of varnish incident to the heating of the oil is prevented.

Other objects and advantages of the invention will be apparent from the following description which describes preferred embodiments thereof.

Reference is now made to the accompanying drawings, in which:

Fig. 3 is an enlarged longitudinal vertical sectional view of the Fig. 1 transmission.

In the drawings in which like reference numerals designate corresponding parts in the following description, the vehicle power plant comprises an internal combustion engine A having a crankshaft 10 which is connected to drive the rear wheels of the vehicle (not shown) through a fluid coupling B, a friction clutch C and a variable speed gear mechanism D.

The fluid coupling B is of the dynamic type and has an impeller 11, a runner 12 and a guide or reaction element 13. The impeller 11 is bolted at 14 to a shroud or housing member 15 which surrounds and encloses the other coupling elements and is fastened to the crankshaft 10 at 16. The connection at 14 is fluid tight and a suitable seal 17 is provided between the engine block 18 and the crankshaft 10 to prevent escape of the engine lubricating oil. The housing 15 carries a ring gear 25 adapted for engagement with the usual starting motor pinion (not shown).

The runner 12 is fastened at 19 to a hub member 20 which is rotatably carried with respect to the crankshaft 10 by means of an anti-friction bearing 21. The hub 20 is splined at 22 to a shaft 23 which has a hollow rearwardly extending portion in which is received the forward portion of an intermediate shaft 24. An overrunning clutch E of the well known cam and roller type is provided between the crankshaft 10 and the shaft 23 and is so arranged that the crankshaft 10 may overrun the shaft 23 during forward drive, but the shaft 23 can never overrun the engine. This permits use of the engine as a brake and starting of the engine by towing the car.

A second hub member 26 of greater diameter than the hub 20 is rotatably carried at its forward end on the hub 20 by means of the anti-friction bearing 27 and carries the guide or reaction element 13 of the fluid converter. The latter is non-rotatably fixed to the hub 26 and is adapted to be held against rotation with respect to the casing 28 to provide reaction during the torque multiplying period of operation of the converter unit and to be clutched to the runner for rotation therewith during the period of direct drive through said unit by means about to be described.

Figure 4:
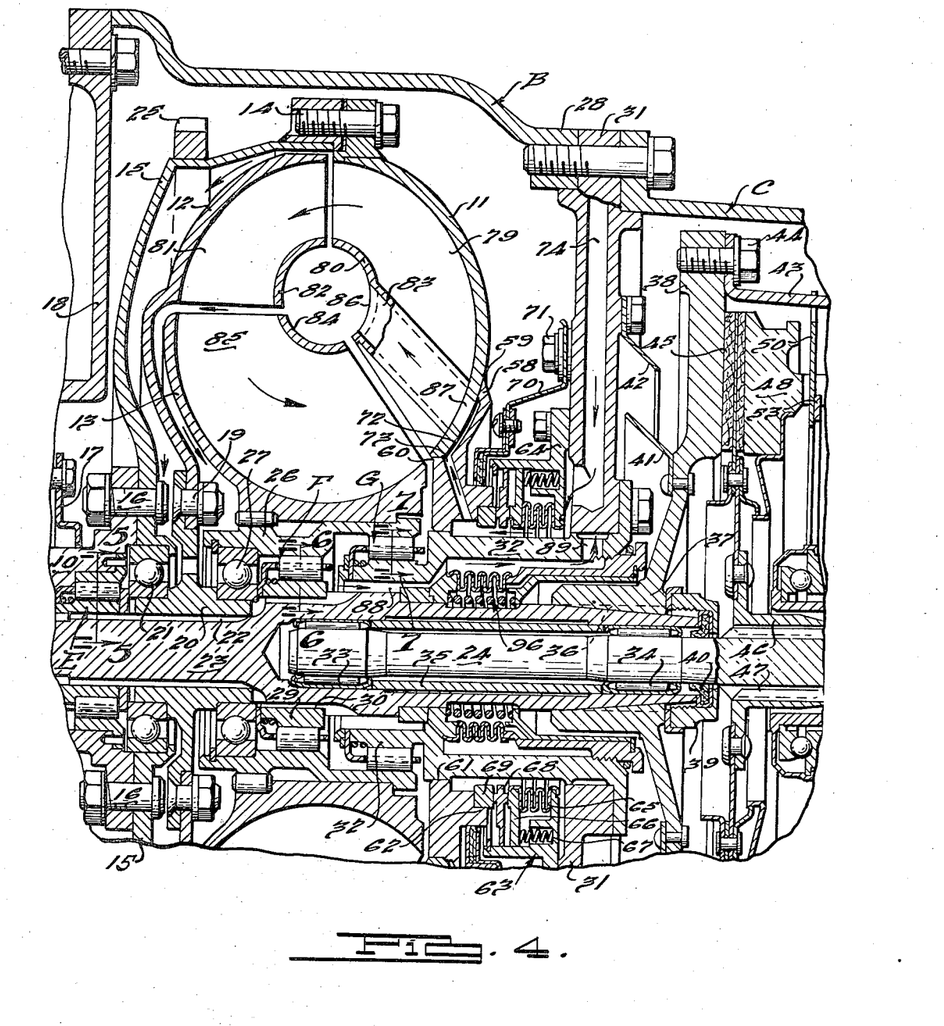
Fig. 4 is a fragmentary sectional view of the fluid torque converter end of the Fig. 1 transmission on a still larger scale.
Figures 5, 6, 7, 8, 9, 10:
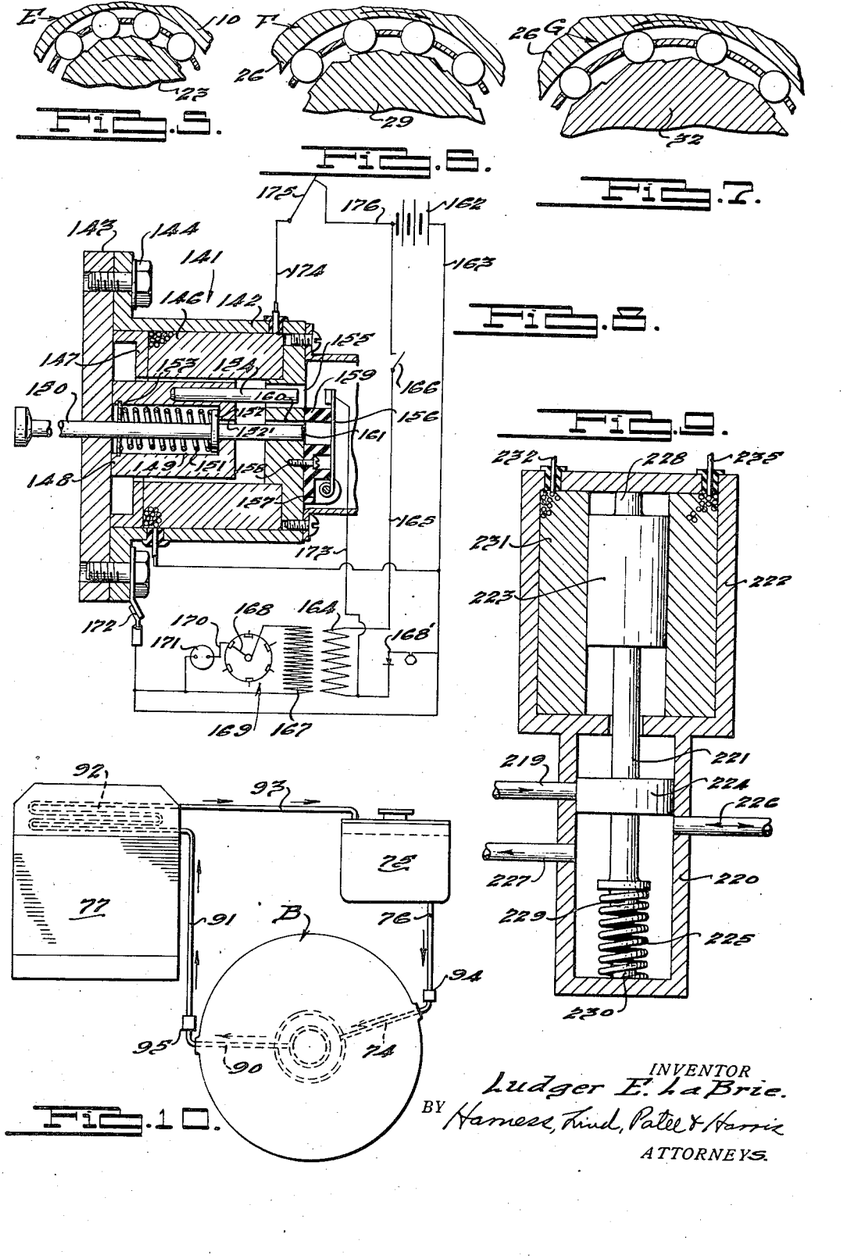
Figs. 5, 6 and 7 are sectional views taken respectively on lines 5—5, 6—6 and 7—7 of Figs. 3 and 4.
Fig. 8 is a sectional view along line 8—8 of Fig. 2.
Fig. 9 is an enlarged view in section of the clutch control valve mechanism of Fig. 1.
Fig. 10 is a diagrammatic view of the fluid cooling circulation system.

As can be seen in Figs. 4 and 6, an overrunning clutch device F of the cam and roller type is provided between the hub 26 and the shaft 23, the cam 29 thereof being splined on the shaft 23 at 30. The roller clutch F is arranged such that it will lock the guide element 13 to the shaft 23 whenever the guide element tends to rotate faster than the shaft in a forward or clockwise direction as will be made more apparent later on.

The casing 28 has a radially inwardly projecting part 31 which carries a forwardly projecting axial sleeve 32. The latter has a cam formed thereon near its forward end (see Fig. 7) which cooperates with the rollers of a third overrunning device G, the direction of the cammed surface being such that the guide element 13 is prevented from rotating rearwardly relatively to the casing 28.

The shaft 24 is supported in the hollow portion of the shaft 23 at 33, 34, by suitable bearings, the parts of which are retained in place by a spacer sleeve 35. The shaft 23 has a tapered splined portion 36 near its rear end on which is drivingly carried a clutch driving member 38, the hub 37 thereof being provided with corresponding tapered splines. The member 38 is retained in place by a nut 39 which also holds a suitable seal 40 in sealing relation with the shafts 23, 24. A pair of annular baffle members 41, 42 are carried by the clutch driving plate 38 and the casing end wall 31 respectively and cooperate with each other and the seal 40 to prevent fluid from being thrown on the clutch parts.

The clutch driving member 38 has a cover 43 fastened thereto at 44. A driven disc 45 of usual type is carried by a hub 46 splined at 47 of the shaft 24 and is adapted to be engaged at 53 by a pressure plate 48 which is drivingly connected to the cover 43 at 49 by a thin diaphragm member 50. The member 50 is engaged at the center thereof by a clutch release mechanism generally indicated by the numeral 51, the said mechanism including the usual release bearing 52.

A second diaphragm member 54 is carried by the cover 43 and bears against the flanged portion 55 at its outer periphery and against the lugs 56 of the pressure plate inwardly thereof. The diaphragm 54 is of the "Belleville" type and is designed to exert a force against the lugs 56 tending to urge the pressure plate 48 forwardly thereby to compress the driven clutch disc 45 between the plate 48 and the driving member 38. A coil spring 57 is provided to prevent rattle of the parts.

An annular forging 58 is welded at 59 and 60 to the shell of the impeller 11 and is provided with a bearing surface 61 which engages the sleeve 32 and a shoulder 62 which is adapted to cooperate with a sealing device 63. The latter may be of any suitable type, the one illustrated being of the "Sylphon" type which is well known in the art. The seal is carried by a collar 64 fastened to the end wall 31 of the casing and comprises essentially a bellows 65 which carries a collar 66, the latter being urged by a spring 67 with considerable pressure into contact with a wear collar 68 which in turn bears on the ring 69 carried by the shoulder 62.

An additional sealing member 70 carried by the casing and fastened thereto at 71, surrounds the pressure seal and protects it from grit which might cause wear of the collar 68 with consequent leakage of fluid.

The member 58 is provided with passages 72, 73 which communicate with the annular space between the sleeve 32 and the seal 63. The latter is in communication with a radially extending passage 74 which, as indicated diagrammatically in Fig. 10, is connected with a fluid reservoir 75 through a pipe 76.

Figure 16:
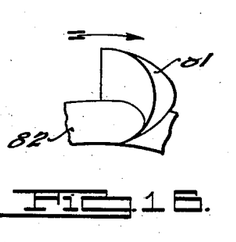
Figs. 16, 17 and 18 are perspective views of the converter vanes taken in the direction of arrows X, Y and Z on Fig. 3.
Figure 17:
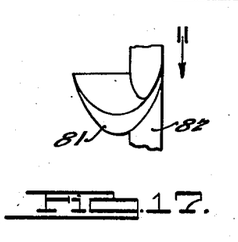
Figure 18:
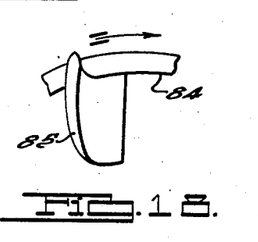
Figure 19:
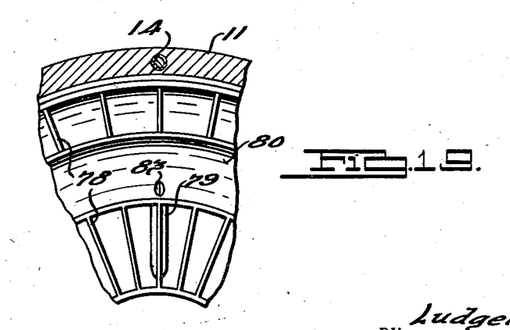
Fig. 19 is a sectional view along the line 19—19 of Fig. 3.

The working fluid of the converter is supplied from reservoir tank 75 to the impeller through the pipe 76 as indicated by the arrows on Figs. 4 and 10. The impeller 11 acts as a pump and in addition to delivering fluid under pressure to the passages of the runner 12, it also maintains a continuous exchange of fluid between the converter, the reservoir 75 and a cooling coil disposed in the upper tank of the vehicle radiator 77. As illustrated in Fig. 19, the vanes 78 of the impeller are of stamped construction. The vanes are welded to the outer shell of the impeller at their outer edge portions and to a torus member 80 of annular form at their inner edge portions. The vanes 81 and 85 of the runner and guide respectively are of die cast construction and are welded to the respective shells thereof and to torus members 82 and 84 as shown in Fig. 4. The vanes of the impeller are straight and are radially disposed with respect to the rotational axis, while the vanes of the runner and guide are of curved configuration as illustrated in Figs. 16, 17 and 18, which show the appearance of these blades when viewed as indicated by the arrows on Fig. 3.

The impeller is provided with a plurality of vanes or blades 79 formed with a hollow passage 83. These vanes may be of die cast construction or may be formed by welding two thin grooved vanes together as desired. The passage 83 is disposed in such manner that it connects the passage 72 with the inner hollow annular space formed by the torus members 80, 82 and 84, openings 86 and 87 being provided in the impeller torus member and shell respectively.

During rotation of the impeller, the fluid from reservoir 75 is pumped through the passage 83 into the torus portion from whence it enters the working circuit of the converter through the clearance openings between the marginal portions of the impeller, runner and guide member respectively. At the same time, fluid is continuously withdrawn from the working circuit at the outer portions of these clearance openings and this fluid flows radially inwardly, as indicated by the arrows on Fig. 4, until it finds its way into the space 88 provided between the sleeve 32 and the shaft 23 from whence it is withdrawn from the converter through passage 89. The latter is connected with a radially disposed passage 90, which is in turn connected with a cooling coil 92 through a pipe 91. The cooling coil 92 is disposed in the upper tank of the vehicle radiator 77 and communicates with the fluid reservoir 75 through a pipe 93.

A second sealing device 96 of a type similar to the seal 63 is provided between the casing mounted sleeve 32 and the shaft 23, as more clearly shown in Fig. 4, and effectively prevents fluid flowing through the annular space 88 into the discharge passage 89 from leaking into the housing of clutch C.

The fluid exchange circuit is provided with a pair check valves 94, 95, shown diagrammatically in Fig. 10. The valve 94 is in the input side of the circuit and is preferably set to open at approximately ½ lb. pressure. The valve 95 is in the output side and is preferably set to open at approximately 10 lbs. pressure. It is thus apparent that during operation, the converter will be kept full of fluid under pressure high enough to expel air and gases therefrom, and a continuous exchange of fluid will take place between the converter and the cooling coil 92.

Upon rotation of the impeller 11 by the engine A, the working fluid will be delivered to the vane passages of the runner 12 thereby causing the latter to revolve. The fluid then passes from the runner passages into the vane passages of the guide or reaction member 13 from which it is delivered into the impeller passages for a repetition of the cycle. The vanes of the impeller are straight, as aforesaid, and those of the runner and guide members are curved, as illustrated in Figs. 16–18.

As the vehicle is started from standstill, the torque demand on the shaft 24, which is connected to the rear wheels through gearing about to be described, will, of course, be at its maximum. Due to the shape of the vanes in the runner and guide member, the former will be rotated by the pressure fluid at a speed lower than the impeller and the guide member 13 will have a tendency to rotate in an opposite direction such action being prevented by action of the overrunning brake device G which locks the guide member to the casing mounted sleeve 32. The torque supplied by the runner 12 to the shaft 23, which is normally drivingly coupled to the shaft 24 through the friction clutch C, is thus multiplied and the fluid torque converter acts as the equivalent of a gear reduction mechanism.

As the vehicle increases in speed, the torque demand on the shaft 24 will decrease and the runner 12 will tend to increase in speed until it is rotating at a speed approximately equal to that of the impeller. There will always be some slip between the impeller and runner but this will be small at car cruising speeds. As the speed of the runner approaches the speed of the impeller, the reaction force tending to rotate guide member 13 backwardly will continually decrease until it reaches zero. Further increase in the speed of the runner relatively to the impeller will cause a reversal of the force direction of the fluid entering the guide member thus tending to cause the guide member to rotate forwardly with the runner. Under such conditions, the guide member will be released from its locked condition relative to the casing through the action of the overrunning device G and will lock itself to the shaft 23 through the overrunning device F. The runner 12 and the guide member 13 will then rotate as a unit and the torque converter will cease to convert torque and will become a simple fluid coupling of the kinetic type.

The precise condition of operation under which the fluid driving unit will cease to act as a converter and begin to function as a simple slip coupling may be varied by proper proportioning of the parts thereof. In the embodiments shown herein, the unit is designed such that the guide member will release itself from the transmission casing and clutch up to the runner shaft when the runner reaches a speed of approximately 70% of the impeller speed. This occurs at a car speed of about 20 M. P. H., acceleration above this speed being sufficient without torque multiplication through the fluid drive unit.

With the aforesaid driving arrangement, the advantages of both the fluid torque converter and the fluid slip coupling may be realized and the disadvantages inherent in each may be substantially eliminated. As is commonly known, the fluid torque converter operates with maximum efficiency when the unit is being operated to produce the speed reduction characteristic for which it was designed; and, when operated at speed ratios above and below this figure, the efficiency falls off rapidly as the speed ratio is varied. On the other hand, the fluid slip coupling has an inherently high operating efficiency when the runner is rotating above its stall speed.

Accordingly, my invention contemplates that the fluid torque converter unit shall be designed so that it will multiply the engine torque available at the shaft 10 until the vehicle has been accelerated to a cruising speed of approximately 20 M. P. H., at which point the torque demand at the shaft 24 will of course be comparatively low, and the fluid unit will then cease to multiply torque and will function as a slip coupling under all conditions of vehicle operation above a speed of approximately 20 M. P. H.

The shaft 24 is supported at its rearward end in the end wall 103 of a gear casing 102 by the anti-friction bearing 101, and has a gear 100 integrally formed therein, as shown in Fig. 3. Gear 100 is in constant meshing engagement with the gear 106 which together with the integrally formed gears 107 and 108 is mounted rotatively on a countershaft 109 which is disposed in axially parallel relationship with the shaft 24 and a tailshaft 110. The latter is piloted in the hollow portion 111 of gear 100 by means of a roller bearing 112 and is supported at the rear end of the gear casing 102 by an anti-friction thrust bearing 113, through the intermediary of a sleeve 114 which is splined on the shaft 110 and which has the speedometer drive gear 104 formed on its rear end and a set of male clutch teeth 115 formed on its forward end. The second sleeve 116 is splined on the extreme rear end of shaft 110 and cooperates with the fluid seal 117 to prevent the escape of fluid from the rear end of the gear casing. A brake drum 118 is fastened to the sleeve 116 by bolts 119 and form part of a conventional transmission shaft brake assembly.

Formed integrally upon the extreme rearward end portion of the shaft adjacent the gear 100 is a clutch member provided with a plurality of ramped teeth 105 which are adapted to mesh with mating internal teeth 121' formed on a slidable coupling sleeve 121. The teeth 105 and 121' are more clearly shown in Figure 14. Teeth 121' are in constant meshing engagement with teeth 122' formed on the forward end of sleeve 122 which is splined on shaft 110 as shown in Fig. 3.

Sleeve 122 carries a second sleeve designated 123 on which is formed a gear 124 which is normally meshed with the countershaft gear 107 during forward drive of the vehicle. An overrunning clutch device L of the reverse type (see Fig. 12) connects the rear end portion of shaft 24 with shaft 110 in such manner that shaft 24 may overrun shaft 110 in the forward (clockwise) direction whenever the coupling sleeve 121 is disengaged from the clutch teeth 105.

A second overrunning clutch K is interposed between sleeves 122 and 123 and permits sleeve 122 to overrun sleeve 123 in the forward direction during drive of the vehicle forwardly in direct drive and also permits sleeve 123 to overrun sleeve 122 in a rearward (counterclockwise) direction during reverse driving of the vehicle as will be presently made apparent. Clutch K establishes a driving relationship between sleeves 122 and 123 whenever sleeve 123 tends to overrun sleeve 122 as is the case when the coupling sleeve 121 is disengaged from shaft 24 and the underdrive mechanism is operating. The functions of overrunning clutch devices L and K will be more fully brought out later on in this description.

From the mechanism so far described, it will be seen that gear 100 may deliver power to sleeve 122 which has a splined connection to the tail shaft 110, through clutch teeth 105, coupling sleeve 121 and clutch teeth 122' of sleeve 122 or, if coupling sleeve 121 is moved rearwardly to disengage the teeth 121' from the teeth 105, the direct driving relationship between shaft 24 and sleeve 122 will be released and power will be delivered from gear 100 to sleeve 122 through countershaft gears 106 and 107, gear 124, sleeve 123 and roller clutch K.

Reverse driving of the vehicle may also be obtained by proper setting of the mechanism in casing 102 through manipulation of the manually operable shift lever 125. The latter is pivotally mounted on the transmission casing by means of a shaft 126 on the inner end of which is fixed an arm 127, the lower rounded end of which is engaged in a slot 129 formed in the shift collar 128. The latter is slidably mounted on the shaft 130 which is disposed longitudinally of the casing 102 and fixed thereto at each of its ends. Shaft 130 is divided with a plurality of grooves 131 which are adapted to be engaged by the spring pressed ball of a detent 132.

Figure 2:
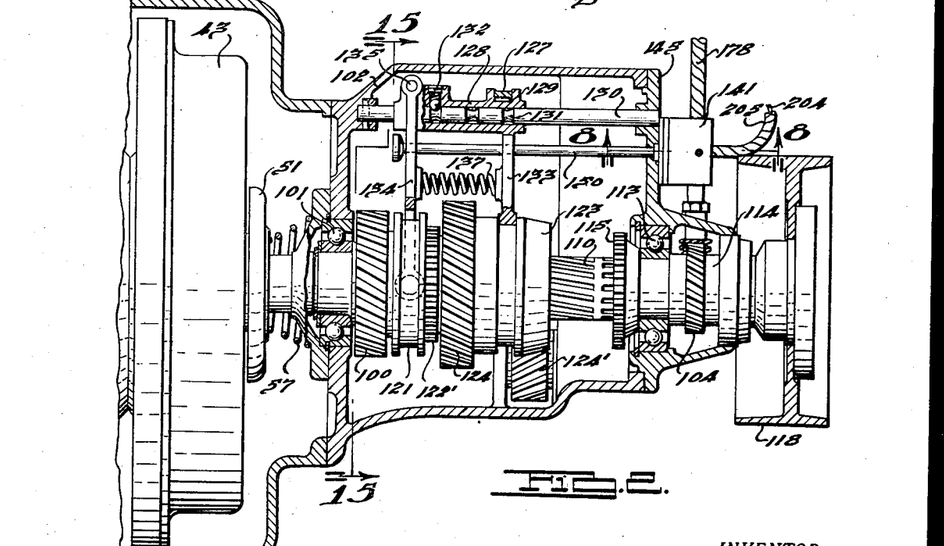
Fig. 2 is a sectional view along the line 2—2 of Fig. 1.
Figures 2, 11, 12:
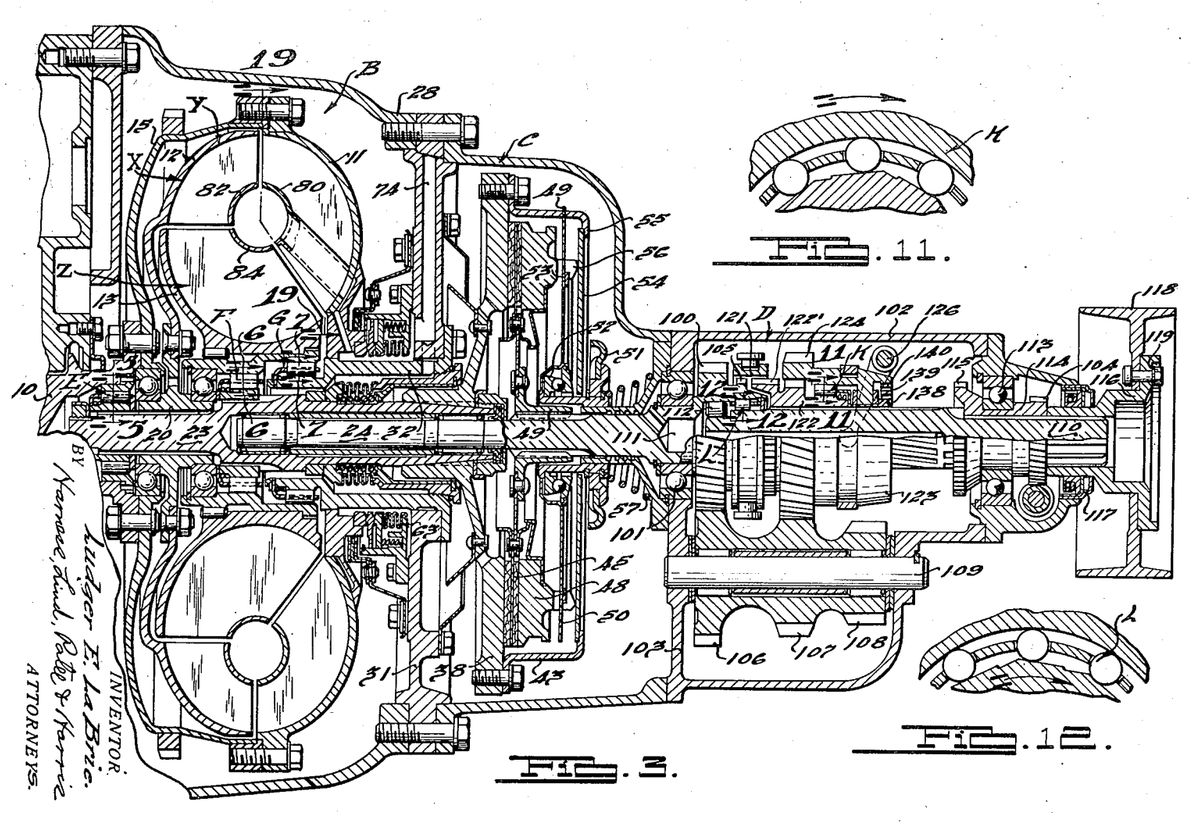
Figs. 11 and 12 are enlarged sectional views along lines 11—11 and 12—12 respectively of Fig. 3.

Formed integrally on collar 128 is a shifter fork 133 which rigidly engages a groove formed in the rearward end of sleeve 123 as is clearly shown in Fig. 2. A second shifter fork 134 is pivoted at 135 to the collar 128 which has a stop 136 (Fig. 15) formed thereon to limit pivotal movement of fork 134 in the forward direction. A coil compression spring 137 yieldably urges the fork 134 against the stop 136.

Figure 1:
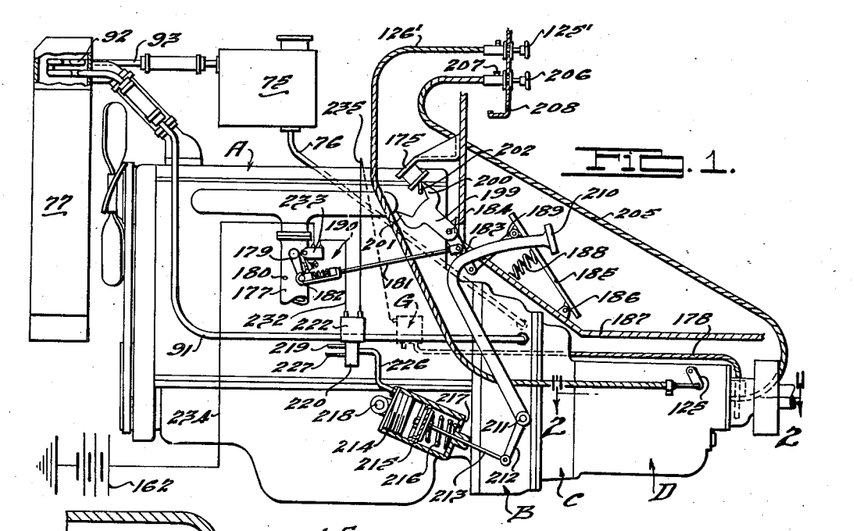
Fig. 1 is a fragmentary view in side elevation of a motor vehicle power plant embodying my novel and improved transmission.

Figs. 2 and 3 show the various parts in a forward direct driving position. To secure reverse setting of the mechanism, the lever 125 is moved forwardly by manual operation of the control member 125' which is mounted on the instrument panel of the vehicle as shown in Fig. 1 and has an operative connection with the lever 125 through the Bowden cable 126'. Forward movement of the shift lever 125 slides the collar 128 bodily along the shaft 130 in a rearward direction until the spring pressed ball of detent 132 engages the rearmost groove 131 as collar 128 is shifted rearwardly. Sleeve 123 and coupling sleeve 121 are also shifted because of the stop 136 and the connection between these elements through forks 133 and 134. By referring to Fig. 3 it may be seen that sleeve 122 is shifted along the sleeve 123 due to the connection between these elements afforded by the grooved collar 138 and snap ring 139 respectively. As the assembly is shifted rearwardly, gear 124 is moved out of meshing engagement with countershaft gear 107 and into mesh with idler gear 124' (Fig. 2) and female clutch teeth 140 which are formed on the extreme rearward end of sleeve 123 are meshed with the male clutch teeth 115 formed on the sleeve 114 as aforesaid.

Reverse or counterclockwise rotation may now be imparted to sleeve 114 and shaft 110 through gear 100, countershaft gears 106 and 108, idler gear 124', gear 124 and clutch teeth 114 and 115; sleeve 123 overrunning sleeve 122 through the overrunning clutch device K, the overrunning clutch device L permitting shaft 110 to rotate in an opposite direction to shaft 24.

As previously stated, rearward movement of the coupling sleeve 121 to a position such that the teeth 121 thereof are out of meshing engagement with the teeth 105 when the parts are in the position shown in Fig. 3 will cause the vehicle to be driven through the countershaft gears 106 and 107 at a reduced speed relative to shaft 24. The apparatus for controlling the underdrive mechanism will now be described, reference being made to Figs. 2, 3, 8 and 15 particularly.

The underdrive mechanism is brought into operation at the will of the driver by an electrically operated device comprising a solenoid designated generally at 141 which is mounted on the right hand side of the transmission casing adjacent the rear end thereof. The solenoid is contained within a casing 142 having a lateral flange secured to a plate 143 by spools 144. Plate 143 is in turn secured to the rear wall 145 of the transmission casing by suitable fastening means. Contained within the casing 142 is the usual solenoid coil 146 spaced from the plate 143 by the spacer 147 having a central opening accommodating the solenoid core 148. The latter has an opening 149 therein through which extends the coupling sleeve actuator rod 150 and within which is disposed a coil spring 151 surrounding the rod 150. One end of the spring 151 abuts the washer 152 fixedly mounted on the rod 150, the washer abutting the adjacent face of the radially inwardly extending portion of the end wall 148 which portion has an opening 152'. The opposite end of the spring 151 seats against an abutment 153 secured to the core 148. The relation of spring 137 (Fig. 2) to spring 152 is such that when the latter is compressed by movement of core 148 to the right, as shown in Fig. 8, the built up energy is sufficient to move rod 150 and fork 134 to the right against the resistance of spring 137 thus retracting the coupling sleeve 121 to its disengaged position as will be presently made more apparent.

Carried by and movable with the solenoid core 148 is a metallic rod 154 having a portion thereof extending axially beyond the adjacent end face of the core and extending into an opening 155 in the end face of the casing 142. The rod 154 is adapted upon movement of core 148 in response to energization of the solenoid to engage a contact point on an oscillatable switch blade 156 which is connected in the engine ignition system as hereinafter set forth. The switch blade 156 is carried by an insulating mounting 157 secured by a screw 158 to casing 142. An insulating leg 159 is carried by blade 156 and engages the end face of the casing 142, it being understood that the blade is yieldably urged to the position shown in Fig. 8 by suitable means such as a light spring.

The end face of the casing has an opening 160 accommodating the free end of rod 150, the latter being provided with an electrically insulated extremity 161, engageable with the switch blade 156 for the purpose hereinafter set forth, it being understood that the rod 154 is adapted upon energization of the solenoid to engage the switch blade contact point prior to engagement of the insulated extremity 161 of rod 150 with the switch blade. As will be presently made clear, the rod 154 is moved to engage the contact point of switch blade 156 for momentarily interrupting the engine ignition circuit while subsequent engagement of the insulated extremity 161 of rod 150 with the switch blade reestablishes the ignition circuit.

The switch 156 is connected in the internal combustion engine ignition system or circuit which may be of any desired type and as herein illustrated includes the usual storage battery 162 having a connector 163 to the primary 164 of the ignition coil and a return connector 165 in the latter of which is interposed a suitable ignition switch 166. The circuit also includes the secondary coil 167 connected with the movable member 168 of the distributor indicated generally at 169, the latter having a series of stationary contacts connected by circuit wires to respective spark plugs of the vehicle engine. One such connection is indicated at 170 for the insulated member of the spark plug 171, the opposing member of the spark plug being grounded to the engine as is also the coil 167 as indicated at 172. Connector 173 connects the switch blade 156 with one side of the primary coil 164. The solenoid coil 146 is connected to the aforesaid circuit by wire 174, the circuit to the solenoid being controlled by a switch 175, the other side of the switch 175 being connected to the battery 162 through a wire 176.

A make and break switch indicated at 168' operates in timed relation with the movable member 168. That is to say, the contact is broken as the member 168 engages a respective contact point and contact is made as the member 168 breaks contact with the aforesaid point.

The switch indicated at 175 is controlled by manipulation of a suitable vehicle driver operable member illustrated herein as the accelerator pedal for the engine throttle control member. Referring to Fig. 1, it may be seen that the engine A is provided with the usual intake manifold to which is conducted the usual gasoline and air mixture from a carburetor 177 under control of the usual butterfly valve adjustable by a lever 179 so that when the throttle valve is in its wide open position the lever 179 will engage a stop 180 to prevent opening movement of the lever 179. The operating rod 181 has one end thereof pivotally connected at 182 to the lever 179, the other end of the rod being operatively connected to a lever 183 pivotally supported on the vehicle at 184 for swinging movement.

The swinging movement of lever 183 is controlled preferably by the foot operated accelerator pedal 185 pivotally supported at 186 on the vehicle driver compartment toe board 187, a spring 188 yieldably urging pedal 185 upwardly to throttle closing position. A short arm 189 operatively connects pedal 185 with the lever 183.

Figures 13, 14, 15:
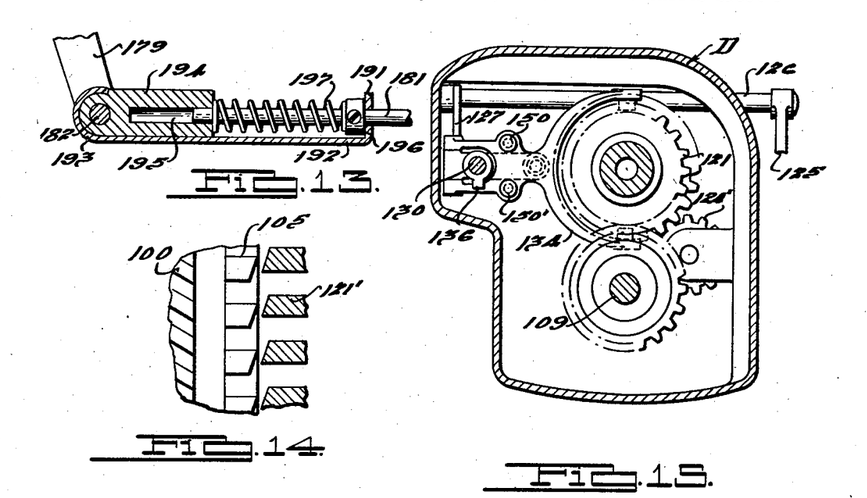
Fig. 13 is an enlarged sectional view of the lost motion throttle valve adjusting mechanism of Fig. 1.
Fig. 14 is an enlarged fragmentary sectional view of the kickdown coupling element.
Fig. 15 is a sectional view along line 15—15 of Fig. 2.

The throttle valve actuating rod 181 is pivoted to the throttle valve control lever 179 through a lost motion mechanism indicated generally by the numeral 190 and more clearly shown in Fig. 13.

The rod 181 is adapted to slide through an opening in an ear 191 of a bracket 192, the latter having a forward portion 193 secured to a guide block 194 provided with a rearwardly open bore 195 and having a pivotal connection at 182 with the throttle control lever 179. Rod 181 has fixed thereto a collar 196 forwardly adjacent the ear 191, a preloaded spring 197 surrounding the rod and acting between the block 194 and the collar 196 so that normally this spring serves as a connection between rod 181 and block 194. The spring 197 functions as an overtravel spring and permits rod 181, lever 183 and pedal 185 to have a certain amount of overtravel after the lever 179 has engaged the stop 180. During this overtravel of the accelerator pedal 185 spring 197 advises the driver that he is manipulating the accelerator pedal beyond the wide open throttle position for actuation of the kickdown mechanism by reason of the extra resistance in addition to spring 188 afforded by the compression of spring 197 when collar 196 moves toward the block 194. In other words, when the accelerator pedal is manipulated to kickdown position for causing the underdrive mechanism to function, an extra resistance is encountered by reason of compressing spring 197 during operation of the Fig. 13 mechanism which accommodates overtravel of the accelerator pedal beyond its wide open throttle position. The forward end of rod 181 is slidably disposed in the bore 195, the bracket 192 limiting the operating tendency of the rod 181 and block 194 under the action of spring 197.

When the accelerator pedal 185 is depressed to accelerate the vehicle by opening the throttle valve in the carburetor 177, link 189 operates to swing the lever 183 forwardly about its pivot 184, rod 181 thrusting block 194 forwardly without relative movement therebetween so as to swing lever 179 forwardly and, as the accelerator pedal is depressed to the end of its range opening movement, the lever 179 will engage the stop 180. The accelerator pedal is then adapted to have a further range of movement overtraveling the throttle valve while maintaining the latter in its wide open position and in order to accommodate this overtraveling movement, the mechanism illustrated in Fig. 13 comes into action so that during forward overtravel of rod 181 the said rod will slide in the bore 195 and compress the spring 197 without forwardly moving block 194 of the throttle operating lever 197 which rests against the stop 180. Upon release of the accelerator pedal 185, spring 188 assisted by spring 197 operates to restore the parts to the throttle closed position illustrated in Fig. 1. During this return movement of the parts rod 181 and the parts between this rod and the shaft 186 move relative to block 194 and lever 179 until the collar 196 engages the ear 191 of the bracket 192 and thereafter spring 188 moves rod 181 along with the block 194 and lever 179 without lost motion until the throttle valve is restored to closed position and the accelerator pedal 185 is correspondingly positioned as illustrated in Fig. 1.

The aforesaid overtravel movement of the accelerator pedal 185 is adapted to effect energization of the solenoid 141 through operation of the switch 175. A switch operating lever 199 is fixed to the lever 183 and is adapted to move therewith, this lever 199 having a pair of switch operating fingers 200 and 201 alternately engageable with the swinging operating element 201 of the switch 175 which is preferably of the well known snap-over type.

In the fully released (throttle closed) position of the accelerator pedal 185, as illustrated in Fig. 1, the finger 200 has operated the switch element 202 so that the switch 175 is open and when the accelerator pedal 185 is depressed to the limit of its aforesaid throttle opening range of movement the finger 201 has been swung upwardly about the lever support 184 and into engagement with the forward face of the switch element 202. When the accelerator pedal is depressed for the aforesaid overtravelling range of movement, the finger 201 then swings switch operating finger 202 in a counterclockwise direction and causes this element to have the usual snap action in closing the switch. When the accelerator pedal is again released to its wide open throttle position, finger 200 does not immediately engage switch element 202 for restoring the switch to its open position, this finger 200 preferably engaging the switch element when the pedal 185 nears the end of its fully released position such that the last portion of the releasing movement of the pedal is utilized for causing finger 200 to effect the snap-over switch opening movement of the element 202 in restoring the parts to their Fig. 1 position.

As illustrated in Figs. 1 and 2, a Bowden wire 204 enclosed in a sheath 205 is attached to the rear bottom portion of a solenoid casing. This Bowden wire extends upwardly to an operative connection with a manually operated control element 206, mounted on the vehicle instrument panel 208. A suitable detent mechanism 207 is provided for releasably holding the element 206 in one or the other of two operative positions. At its lower end wire 204 is operatively connected to a second coupling sleeve control rod 150' (Fig. 15). Control rod 150' is identical in its operation with rod 150 but differs as to the control features thereof. Rod 150' extends through a hole in the shifter fork 133 and through an enlarged hole in the member 134 in a manner identical with rod 150. When the control element 206 is in the position shown in Fig. 1, rod 150' is in its corresponding forward position identical to that of rod 150 in Fig. 2 and coupling sleeve 121 is in its engaged postion as shown in Figs. 2 and 3. When it is desired to drive the vehicle through the underdrive mechanism under such conditions that it would be undesirable to bring the underdrive into operation by means of the solenoid control, the control element 206 is pulled rearwardly to its outward position in which it is releasably held by the detent 207 thereby exerting a pull on the Bowden wire 204 and effecting a rearward movement on the control rod 150' which disengages coupling sleeve 121 from driving engagement with teeth 105. Movement of control element 206 forwardly to its inner position will move rod 150' forwardly thereby permitting spring 137 to urge fork 134 forwardly for effecting an engagement of coupling sleeve 121 with teeth 105 at the instant the two become synchronized as will be presently explained. It can thus be seen that a manual control is provided for actuation of the coupling sleeve 121 that is entirely independent in its operation from the accelerator operated kickdown mechanism. The manual control element 206 might be operated to lock the parts in underdrive position for sustained periods under various conditions of operation such as those encountered when the vehicle is ascending a long hill or for sustained driving in heavy traffic at low speeds, etc.

Figures 20, 21, 22, 23:
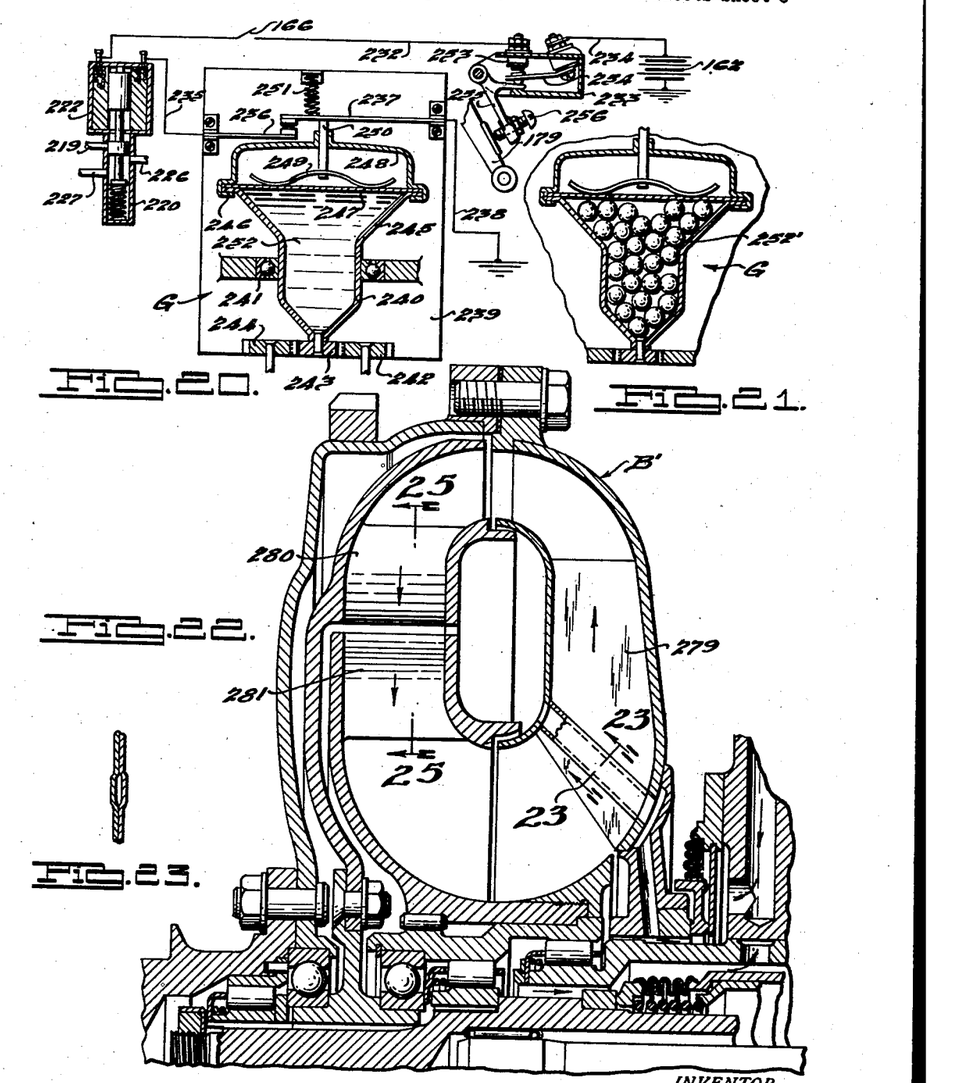
Fig. 20 is a combined sectional and diagrammatic view of the clutch control mechanism.
Fig. 21 is a sectional view of a modified form of governor for use in the Fig. 20 control mechanism.
Fig. 22 is a fragmentary view of a modified form of torque converter for use in the Fig. 3 transmission.
Fig. 23 is a sectional view along line 23—23 of Fig. 22.

Referring now to Figs. 1, 9 and 20, it will be noted that a clutch pedal 210 is operatively connected to the release mechanism 51 of the friction clutch C by a shaft 211. The latter has an arm 212 also operatively connected thereto which is in turn connected to a piston rod 213 of a fluid cylinder 214. The fluid cylinder 214 may be of any well known type and preferably has the usual piston 215 therein for reciprocation of the rod 213. A coil spring 216 biases the piston 215 toward clutch engaged position and a vent 217 is provided to prevent a vacuum from being formed in the lower end of the cylinder. The cylinder 214 is pivotally mounted at 218 on the engine housing to accommodate accurate movement of the arm 212.

For operation of the fluid pressure motor 214, the regular engine pressure oil circulation system is preferably employed. Inasmuch as a source of oil under pressure is a conventional accessory of all modern internal combustion engines, the system will not be described in detail, it being considered sufficient to indicate that oil under regular engine lubrication pressure is supplied through a pipe 219 to a valve 220, the latter being of the type having a stem 221 adapted for reciprocation by an electrical solenoid 222.

The plunger 223 of the solenoid is carried directly on one end of the stem 221 which has an enlarged portion 224 in peripheral engagement with the valve casing. A coil spring 225 engages the stem 221 at the lower end thereof and urges it upwardly to the position shown in Fig. 9 which corresponds to the positions of the parts in Figs. 1 and 3. A flexible conduit 226 connects valve 220 with motor cylinder 214 and the exhaust chamber of the valve is connected with the sump of engine A through a pipe 227. The valve stem 221 is provided with stop portions 228 and 229 which are respectively adapted to engage the upper wall of the solenoid casing and a stop 230 carried by the lower wall of the valve casing thereby to define the stroke of the stem.

Solenoid coil 231 is connected through wire 232 with a switch 233, the other side of said switch being connected to the battery 162 through wire 234. The other side of the coil 231 is connected through a wire 235 with fixed contact 236 of a speed controlled governor switch mechanism referred to generally by the letter G. The mechanism G has a movable contact 237 connected to ground through wire 238, and comprises a casing 239 in which is rotatably supported a housing 240 by means of an anti-friction bearing 241. The housing is adapted for rotation by a driving gear 242 driven by flexible cable 178 which is drivingly connected to the tail shaft gear 104 (Fig. 2). Gear 242 meshes with a gear 243 fixed to the housing 240. A gear 244 also meshes with gear 243 and is adapted for connection to the usual speedometer (not shown) by a cable similar to 178.

Housing 240 has a conical portion 245 which terminates in an annular marginal flange 246. A flexible diaphragm 247 is rigidly held in marginal contact with the flange 246 by a flanged cover 248 as illustrated in Fig. 20. A spring element 249 which rests on the upper side of diaphragm 247 has an upstanding member 250 attached thereto, the member 250 protruding through a suitable hole in the cover 248 and into engagement with the flexible switch contact arm 237. The latter is normally urged into circuit forming position by a spring 251 as shown in Fig. 20. Housing 240 is filled, at least partially, with a diaphragm actuating mass 252 adapted for displacement by centrifugal force when the housing is rotated. The mass 252 is preferably of mercury, but may consist of a plurality of metal balls or shot, as illustrated in the modified form of governor of Fig. 21 at 252'. In Fig. 20 the mechanism is shown in circuit closing position which is the normal position when the tail shaft 110 is stationary or is rotating at a speed below 4 M. P. H. car speed.

The switch 233 which connects the other side of the solenoid 222 to the battery has a stationary contact 253 and a flexible contact arm 254 which are mounted in a suitable insulating casing and connected as shown in Fig. 20. The flexible contact arm 254 is biased toward open, or circuit interrupting position, and is engaged by one leg of a V-shaped lever 255, the other arm of which engages the throttle valve control arm 179 at engine idle position of the latter, through a screw 256 which permits adjustment for clearance. The switch 233 is adapted to open upon initial throttle opening movement of the arm 179 and to remain open until the arm 179 is permitted to return to engine idle position by release of the accelerator pedal. In Fig. 20 the switch is shown in open, or circuit interrupting position, the lever arm 179 having been moved slightly about its pivot to accelerate the vehicle.

It may thus be seen that the friction clutch C is adapted for automatic release to break the drive to the rear wheels whenever the circuit to solenoid 222 is completed, and for automatic engagement whenever said circuit is interrupted which occurs when either the switch 233 or the switch G is opened. This function will be more fully brought out later on in this specification.

In the operation of the power transmission as a whole, we will assume that the selector element 125' is positioned in neutral and that the engine A is not operating, this being the condition of the parts when the car is parked. The sleeve 128 will be positioned intermediate its forward and reverse positions and the ball of detent 132 will be engaged in the centrally located groove 131 of the rod 130 (Fig. 2). We will further assume that the control member 206 is in its Fig. 1 position so that the coupling sleeve control rod 156' is in its forward position which corresponds to the normal forward position of the control rod 150 as shown in Fig. 2. As the engine A is not operating, there will be no oil pressure on in pipe 219 consequently the piston 215 of the fluid pressure motor 214 will be urged to its forward position by the spring 216 and clutch C will be engaged. Both the governor control switch G and the throttle lever control switch 233 will be closed; the switch G as aforesaid closes when the speed of the tail shaft drops to approximately 3 M. P. H. and the switch 233 closes when the throttle valve control lever 179 is returned to engine idle position.

When it is desired to drive the vehicle forwardly the engine is started in the usual manner, the transmission mechanism still being in neutral thereby causing rotation of crankshaft 10, housing 15 and impeller 11 of the torque converter B. As soon as the ignition switch 166 is actuated to "on" position the solenoid 220 which controls operation of the fluid pressure motor 214 will be energized and the valve stem 221 will move downwardly to establish communication between conduits 219 and 226 and cut off communication between conduits 226 and 227 thus introducing oil from the engine lubrication system into the fluid motor 214 and causing the piston 215 thereof to move rearwardly and release clutch C thereby braking the drive between shaft 23 and shaft 24. At idling speed of the motor, the circulation of the fluid in the passages of the torque converter B is correspondingly slow but enough power will be transmitted to the shaft 23 to cause slow rotation thereof which would make it impossible to shift gears in the transmission mechanism D unless clutch C is disengaged. When the engine is cold the shaft 23 will of course be rotated at a correspondingly faster rate due to the "fast idle" mechanism which is commonly provided and which is effective until the engine reaches its normal operating temperature. Release of clutch C under the aforesaid conditions has also another important function in that it prevents "creep" of the vehicle should the transmission mechanism D be in gear at the time the engine is started.

Movement of the selector element 125' to forward driving position will cause corresponding movement of the arm 125 to engage sleeve 123 and forward drive may now be accomplished smoothly and silently. As will be apparent from Figs. 2, 3 and 15, forward swinging movement of the arm 125 will rotate shaft 126 and cause corresponding swinging of fork 127 to thereby move collar 128 forwardly until the ball of detent 132 engages the foremost slot in shaft 130. This will engage gear 124 of sleeve 123 with countershaft gear 107 and coupling sleeve 121 will be moved forwardly to engage the teeth thereof with the clutch teeth 105.

The vehicle may then be started by depression of the accelerator pedal 185 to swing throttle lever actuator arm 179 forwardly. Initial movement of the arm 179 will open switch 233 thereby de-energizing solenoid 222 which will permit the core 223 to be returned to the position shown in Figs. 9 and 20. Communication between conduits 219 and 226 will be cut off and fluid pressure motor 214 will be exhausted through conduit 227 which connects valve 220 with the engine oil sump, spring 216 urging piston 215 forwardly in its cylinder and simultaneously engaging the pressure plate 48 of the clutch C with the driven disk 45. The vehicle is now ready to be accelerated through the torque conversion unit B which at this stage acts as a torque converter, the kickdown unit D being in direct drive condition.

Upon opening the engine throttle, the impeller 11 rotates at an increased speed and the fluid circulated thereby impinges on the blades of the runner 12 and guide element 13. The runner 12 will transmit power to the rear wheels of the vehicle through hub 20, shaft 23, clutch C, intermediate shaft 24, teeth 105, coupling sleeve 121, teeth 122' and tail shaft 110, the guide member 13 being locked against tendency to rotate backwardly through the overrunning device G. As the vehicle increases in speed and the torque demand on the tailshaft 110 decreases, the torque conversion requirement through the unit B will correspondingly decrease until the speed of the runner 12 reaches a speed equal to approximately 70 per cent of the speed of the impeller 11. This will correspond to a car speed of about 20 miles per hour. When this speed has been reached, the direction of the fluid impinging on the blades of the guide element 13 will be reversed and the guide element will then tend to rotate along with the runner 12, this action being accommodated by the overrunning devices G and F respectively, the overrunning device G permitting release of the guide element 13 from its locked up relation with the stationary sleeve 32 and the overrunning device F accommodating lock-up of the guide element to the shaft 23. The runner 12 and guide element 13 will then rotate as a two-part runner and fluid converter unit B will operate as a fluid coupling of the "slip" or kinetic type. Further increase in the rotation of speed of the impeller 11 in accordance with increased opening of the throttle valve will cause a decrease in the slip between the two part fluid runner and the impeller until the two are rotating at approximately the same speed. This condition corresponds to a direct drive through the transmission mechanism, the difference in speed between the input and output shafts being small (in the order of two or three per cent) and due almost entirely to friction loss.

During direct drive the overrunning device K permits sleeve 122 and shaft 110 to overrun the sleeve 123 which is, of course, rotating at a lower speed than the shaft 110 due to the speed reduction through gears 100, 106, 107 and 124.

As soon as the vehicle is accelerated to a speed exceeding approximately 3 M. P. H. the flexible contact arm 237 of the governor control switch G will be moved upwardly as shown in Fig. 20 to open circuit position by action of the mercury 252 which under such conditions will tend to move upwardly under the action of centrifugal force against the diaphragm 247. Release of the accelerator pedal at speeds greater than approximately 3 M. P. H. therefore will not cause the clutch C to be disengaged by action of the fluid pressure motor 214 even though the switch 233 will be closed upon return of the throttle valve control lever 179 to engine idle position because the circuit to the solenoid 222 will be interrupted through the governor control switch G.

The speed at which direct drive through the fluid coupling unit B is reached may be varied by altering the proportions or capacity of the fluid circulating elements as well as by altering the shape of the fluid circulating passages in said elements. For example, reducing the capacity of the runner 12 will act to increase the speed at which direct drive will take place, it ordinarily being preferred to proportion the elements as aforesaid in order that direct drive will be reached at approximately 20 M. P. H.

If faster acceleration of the vehicle at the start is desired, the underdrive gear E may be brought into operation either by actuation of the manual control 206 or by depressing the accelerator pedal 185 to the limit of its overtravel permitted by spring 197 thereby closing switch 175 and energizing solenoid 141 to move coupling sleeve 121 rearwardly where it is disengaged from the teeth 105. Such action is sometimes desirable when starting under a heavy load or when fast pick-up is desired. The vehicle may, of course, be permanently set for sustained operation in underdrive by actuating the control element 206 to underdrive position thereby causing the coupling sleeve 121 to be moved rearwardly to non-driving position through the intermediary of Bowden wire 204 and coupling sleeve control rod 150'. Should the vehicle be started in underdrive by operation of the manually operable control element 206, direct drive through gearset D may be obtained at any time by pushing control element 206 forwardly to direct drive position and momentarily releasing the accelerator pedal 185 to secure a reversal of driving torque through the transmission. Movement of control element 206 to its forward position will, of course, move coupling sleeve control rod 150' forwardly thereby releasing fork 134 and permitting said fork to swing forwardly about its pivot 135 under the influence of the spring 137. At this instant, however, shaft 24 is turning at a considerably faster speed than shaft 110 and sleeve 122, thus the teeth 121' (Fig. 14) of coupling sleeve 121 cannot mesh with clutch teeth 105 until shafts 24 and 110 are synchronized. As will be seen from Fig. 14, the teeth 105 and 121' respectively are ramped in such manner that the teeth 121' can slide over the teeth 105 without clashing. Momentary release of the accelerator pedal will cause a reversal of driving torque through the transmission and the speed of shaft 24 will, of course, immediately fall off. The speed of shaft 24, however, cannot fall below that of shaft 110 because such action will be opposed by the overrunning clutch device L, the rollers of which will wedge into driving engagement whenever shaft 110 tends to overrun shaft 24. At such instant of synchronization of shafts 110 and 24, ramped teeth 121' of coupling sleeve 121 will slide into engagement with the ramped clutch teeth 105 under the influence of the spring 137. Depression of the accelerator pedal will then cause the shaft 24 to drive the shaft 110 at 1 to 1 speed ratio through the coupling sleeve 121. Under such conditions, should roller clutch L lock into driving engagement in such position with respect to clutch teeth 105 and 121' that "dead-ending" of the teeth occurs, coupling sleeve 121 will not drivingly engage teeth 105 until the driver depresses the accelerator pedal slightly, such action causing slight rotation of shaft 24 with respect to shaft 110 thereby permitting teeth 121' to slide into mesh with teeth 105.

It will be noted that roller clutch L prevents free-wheeling of the vehicle at all times even when the sleeve 123 is positioned in neutral. This feature also provides for starting of the vehicle by towing and for use of the engine as a brake while coasting since under such conditions shaft 110 will be coupled to shaft 24 by coupling sleeve 121 (or by overrunning device L should sleeve 121 be disengaged) and runner 12 drives crankshaft 10 through overrunning clutch E.

Operation of the mechanism to obtain reverse driving of the vehicle will now be described. Assuming that the vehicle motor A is operating and the gear in casing D is in neutral position with the gear 124 in intermediate position with respect to countershaft gears 107, and 108 with the ball of detent 132 engaged in the middle groove 131 of rod 130, the driver may obtain reverse setting of the transmission by manipulation of the manual control element 125' forwardly thereby swinging arm 125 rearwardly and moving collar 128 rearwardly until the ball of detent 132 engages the rearmost slot 131 of rod 130. This movement of collar 128 carries sleeves 122 and 123, together with the coupling sleeve 121, rearwardly as a unit thereby meshing gear 124 with reverse idler 124' and engaging female clutch teeth 140 with male clutch teeth 115. Clutch C will, of course, be disengaged at this time and no driving torque will be imposed on shaft 24 and 110 thus accommodating meshing of the teeth 140 with the teeth 115.

The vehicle may then be driven rearwardly by opening of the throttle valve, initial movement of which will effect driving engagement of clutch C by action of fluid pressure motor 214, the driving effort from torque conversion unit B being transmitted from shaft 24 to shaft 110 through gears 100, 106, countershaft gear 108, reverse idler gear 124', gear 124 and clutch elements 140 and 115. During reverse driving of the vehicle, shaft 110 will rotate in a direction opposite to that of shaft 24, this reverse rotation being permitted by the overrunning clutch L.

Whenever the car is being driven on the road, the kickdown underdrive operable by overtravel of accelerator pedal 185 is always available (assuming that control element 106 is in its direct drive position as illustrated in Fig. 1) so that the mechanism D may be manipulated to secure an underdrive to secure fast acceleration for passing another vehicle or for other purposes. The kickdown control is particularly advantageous when the car is driven in the city because it affords a very desirable flexibility of control making it possible to secure rapid acceleration for maneuvering in traffic; it being understood that the present transmission is particularly designed to be used in combination with a relatively fast rear axle ratio, in the neighborhood of 3:3 for example. The kickdown mechanism is brought into action by depressing the accelerator pedal 185 beyond its wide open throttle position thereby closing switch 175 and energizing solenoid 141 to move coupling sleeve control rod 150 rearwardly. The operation takes place at the instant of reversal of driving torque through the transmission caused by momentary interruption of the ignition circuit by switch blade 156.

When the accelerator pedal 185 is depressed to the end of its range of throttle opening movement, the lever arm 179 will engage the stop 180. Further depression of the accelerator pedal 185 to the end of its overtraveling range of movement will maintain the throttle in wide open position and will effect kickdown operation of the mechanism D to secure faster vehicle acceleration. During the overtravel movement of the accelerator pedal 185, the Fig. 13 mechanism comes into operation to permit rod 181 to slide into the bore 195 of boss 194 and compress spring 197. This overtravelling movement effects energization of the kickdown solenoid 141 through operation of the kickdown switch 175 by finger 201 of lever 199. As soon as the solenoid 141 is energized, core 148 thereof will move toward the right of Fig. 8 thereby unloading the spring 151, corresponding rearward movement of the rod 150 being prevented at this instant because of the driving load on coupling sleeve 121. Rearward movement of core 148 toward the right of Fig. 8 causes rod 154 to engage switch blade 156 thereby grounding the primary 164 of the ignition coil and interrupting the engine ignition circuit. Immediately upon interruption of the engine ignition the driving torque on the teeth of coupling sleeve 121 will be relieved permitting spring 151 to move the sleeve control rod 150 rearwardly thereby swinging fork 134 about the pivot 135 to disengage sleeve 121 from teeth 105. Simultaneously with this action the insulated end 161 of rod 150 engages the switch blade 156 and moves it out of contact with the rod 154 thereby re-establishing the ignition circuit and causing the motor to operate under wide open throttle conditions. The vehicle will now be accelerated in kickdown underdrive through gears 100, 106, 107 and 124, the overrunning roller device L permitting gear 100 to rotate faster than shaft 110. In order to continue driving of the vehicle in underdrive, it is not necessary for the driver to maintain the accelerator pedal in wide open throttle position due to the construction of the kickdown switch operating lever 199. The accelerator pedal 185 may be released from wide open throttle position and, as can be seen from Fig. 1, finger 200 of lever 199 will not immediately engage switch element 202 for restoring the switch 175 to open position, this finger 200 engaging the switch element 202 by preference when the pedal 185 nears the end of its fully released position such that the last portion of the releasing movement of the pedal is utilized for causing finger 200 to effect the snap-over switch opening movement of the element 202 in restoring the parts to their Fig. 1 position. This feature permits the vehicle to be driven in underdrive with intermediate throttle opening.

Thus the vehicle may be driven in underdrive at any speed desired by the driver and direct drive conditions through the unit B may be restored at the will of the driver simply by releasing accelerator pedal 185 to its engine idle position. As soon as pedal 185 has been returned to engine idle position by spring 188, switch 175 will be opened as explained above and solenoid 141 will be de-energized thereby permitting core 148 and coupling sleeve control rod 150 to return to their forward positions under the influence of the spring 137 which is continuously acting on the fork 134. Engagement of the coupling sleeve 121 with the teeth 105, however, cannot immediately take place due to the fact that shaft 24 is overrunning shaft 110 and sleeve 122, the coupling sleeve being prevented from moving forwardly to engaged position under the influence of spring 137 by action of the ramped teeth 121'. The teeth 121' of coupling sleeve 121 will continue to rotate past the teeth 105 without meshing therewith until sleeve 122 reaches the speed of shaft 24 and gear 100. This synchronization of shaft 110 and 24 will take place almost immediately after accelerator pedal 185 has been released because after the throttle is closed shaft 24 will decrease in speed but cannot run slower than shaft 110 because of the clutching action of the rollers in overrunning device L. It can thus be seen that shafts 110 and 24 must become synchronized as the speed of the motor falls off by reason of the release of the accelerator pedal. At the instant of synchronization of the shafts 24 and 110, spring 137 will urge fork 134 forwardly and teeth 121' will engage with teeth 105 thereby effecting driving engagement between gear 100 and sleeve 122 unless teeth 105 and 121' "dead-end" as previously explained. Depression of the accelerator pedal in the normal manner will now cause the vehicle to continue driving in direct drive.

It will thus be seen that I have provided a transmission of simple form which combines the best features of the fully automatic and the semi-automatic types. I intend that the transmission be operated as a fully automatic fluid transmission during all ordinary driving of the vehicle, the underdrive unit D being positioned for direct drive, and the variation in torque demand being accommodated by the fluid power transmitting unit B which acts as a torque converter below approximately 20 M. P. H. and as a slip coupling above that speed, thereby providing an extremely flexible and efficient drive which is fully automatic in operation.

The kickdown underdrive unit D is semi-automatic in its operation and is instantly available for fast acceleration at relatively high vehicle speeds by actuation of the accelerator pedal into overtravel range. In addition, the underdrive unit is available, either by operation of the kickdown control or the manual control to provide a sustained reduction drive when desired.

Reference is now made to Fig. 22 which illustrates a modified form of torque converter suitable for use in place of the unit B. The converter B' of Fig. 22 differs in construction from that of Fig. 3 in several particulars which is a more economical construction.

Figures 25, 26:
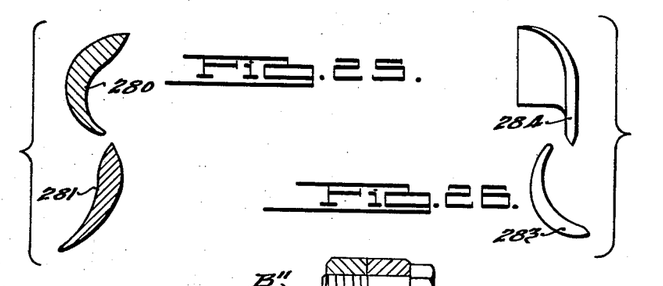
Fig. 25 is a sectional view along the line 25—25 in Figs. 22 and 24.
Fig. 26 is a perspective view of the runner and guide vanes taken in the direction of the arrow 26 on Fig. 24.

The impeller vanes 279 of converter B' are generally similar to those of the Fig. 3 unit and are preferably of stamped construction as illustrated in Fig. 23. The runner vanes 280 and guide vanes 281 differ from those of Fig. 3 in that they curve in one plane only, as illustrated in Fig. 25. By having the vanes 280, 281 curve in one plane only, the manufacture thereof is greatly simplified and the cost materially reduced. The vanes 280, 281 may be die cast of aluminum or molded of suitable plastic composition. The operation of the Fig. 22 modification is similar to that of Fig. 3.

Figures 24, 27:
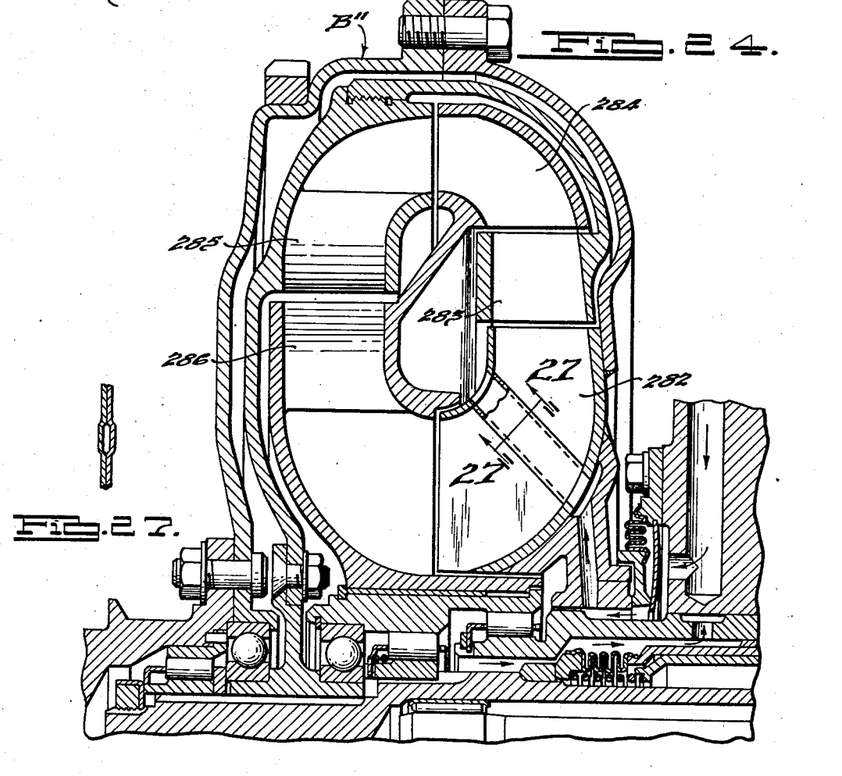
Fig. 24 is a fragmentary sectional view of a second modification of the torque converter.
Fig. 27 is a sectional view along line 27—27 of Fig. 24.

Fig. 24 illustrates a further modification in which the converter unit B" comprises a two stage runner element and a two stage guide element. The fluid is impelled by the impeller vanes 282 into the passages of the first runner stage formed by the vanes 283 and thence into the passages of the first guide or reaction stage formed by the vanes 284. A second runner stage is provided by the vanes 285 and a second reaction stage by the vanes 286. The vanes 285 and 286 are similar in curvature to the vanes 280 and 281 respectively, and the vanes 283, 284 are shown in perspective in Fig. 26 as they appear when viewed from the right side of Fig. 24. All of the vanes of the Fig. 24 modification are preferably of stamped or molded construction except those of the impeller which are preferably of stamped construction. Fig. 27 shows a detail of the double thickness vanes which forms the pump conduit.

The converter unit of Fig. 24 has a high efficiency over a greater range of torque conversion than those of Figs. 3 and 22 and is therefore especially well adapted for use in vehicles having engines of low or medium horsepower, and for heavy vehicles such as trucks and busses.

I claim:

1. In a power transmission for a vehicle having an engine, an accelerator control, a driving shaft and a driven shaft; a casing; an impeller wheel rotatably mounted in the casing and connected with the driving shaft; a fluid operated turbine wheel connected to the driven shaft and adapted to be driven by fluid set in motion by said impeller wheel; a fluid operated guide wheel disposed in series relation with said impeller and turbine wheels; means operable automatically to lock said guide wheel against reverse rotation at low speeds of the turbine wheel thereby to provide a torque multiplying drive between said shafts, said means being releasable automatically in response to forward rotational tendency of said guide wheel; means operable automatically to lock said guide wheel to the driven shaft at relatively high speeds of the turbine wheel thereby to provide a high-efficiency slip-coupling drive between said shafts; a variable ratio gear train connected between the driven shaft and the vehicle drive wheels; a control means for said gear train normally operable to maintain said gear train in direct drive at all vehicle speeds, and means connecting said control means with said accelerator control whereby a shift to underspeed ratio in said gear train may be obtained by operation of said accelerator control to predetermined position and whereby said variable ratio gear train is operable to provide a torque multiplying drive during all aforesaid drive operations of said fluid operated wheels.

2. In a power transmission for a vehicle having an engine, a driving shaft driven by the engine, an accelerator control, a fluid power converter connected to said driving shaft, a driven shaft for driving the vehicle driving wheels, a variable speed gear transmission intermediate said converter and driven shaft and operably connected to each, positive clutching means in said gear transmission for selectively conditioning said gear transmission to establish a direct drive between said converter and driven shaft or an underdrive therebetween; said converter being of a type operable as a torque converter in starting the vehicle from rest to provide a torque multiplying drive between said shafts and operable to provide a high efficiency slip coupling drive at cruising speeds of the vehicle, means for normally actuating said clutching means to condition said gear transmission for direct drive during all operations of said fluid converter, and automatic means operable in response to accelerator movement to predetermined position to condition said gear transmission in underdrive during functioning of said fluid converter as a slip coupling whereby to provide a torque multiplying drive between said shafts and to condition said gear transmission in underdrive during functioning of said fluid converter as a torque converter to provide a multiplied torque multiplying drive between said shafts.

3. In a power transmission for a vehicle having an engine; an accelerator control, a driving shaft driven by the engine, a fluid power converter connected to said driving shaft, a driven shaft for driving the vehicle driving wheels, a variable speed gear transmission intermediate said converter and driven shaft and operably connected to each, positive clutching means in said gear transmission manually operable for selectively conditioning said gear transmission to establish a direct drive between said converter and driven shaft or an underdrive therebetween, means for normally actuating said clutching means to condition said gear transmission for direct drive during all operations of said fluid converter, and means for establishing a step-down in drive in said gear transmission from direct to underdrive including manual means operable at the will of the vehicle driver and automatic means connecting said accelerator control with said clutching means and operable upon actuation of said accelerator control to predetermined position, said fluid power converter being of a type operable as a torque converter in starting the vehicle from rest to provide a torque multiplying drive between said shafts and operable to provide a high efficiency slip coupling drive at cruising speeds of the vehicle, said gear transmission when established in underdrive adapted to multiply the torque drive of said fluid converter to said driven shaft to impart greater acceleration to the vehicle.

LUDGER E. LA BRIE.